United States Patent
Shah

(10) Patent No.: US 7,609,790 B2
(45) Date of Patent: Oct. 27, 2009

(54) JOINT SIGNAL DEMODULATION IN A LOW AND HIGH DATA RATE CHANNEL ENVIRONMENT

(75) Inventor: Yogendra Shah, Exton, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 676 days.

(21) Appl. No.: 11/149,508

(22) Filed: Jun. 10, 2005

(65) Prior Publication Data
US 2005/0277400 A1  Dec. 15, 2005

Related U.S. Application Data

(60) Provisional application No. 60/578,715, filed on Jun. 10, 2004.

(51) Int. Cl.
H03D 1/04 (2006.01)
H04B 1/707 (2006.01)
(52) U.S. Cl. ........................... 375/346; 375/140
(58) Field of Classification Search ................ 375/147, 375/130, 140, 148, 316, 346
See application file for complete search history.

(56) References Cited

U.S. PATENT DOCUMENTS 6,188,718 B1 * 2/2001 Gitlin et al. ................. 375/148
6,879,831 B2   4/2005 Hamabe
6,904,076 B1   6/2005 Tsutsui et al.
2004/0028121 A1* 2/2004 Fitton ......................... 375/144

FOREIGN PATENT DOCUMENTS

JP   11-275061   10/1999
JP   2004-040187  2/2004

* cited by examiner

Primary Examiner—Kevin M Burd
(74) Attorney, Agent, or Firm—Volpe and Koenig, P.C.

(57) ABSTRACT

A receiver is capable of demodulating both high data rate and low data rate transmissions. An antenna receives the high and low data rate transmissions, as a received signal. An interference canceling device cancels a contribution of at least one shared/common channel from the received signal, producing a first interference canceled signal. A first data detector for detecting data of one of the high or low data rate transmissions by processing the first interference canceled signal. An interference canceling device for canceling the detected data of the one transmissions from the first interference canceled signal, producing a second interference canceled signal. A second data detector for detecting data of an other of the high or low data rate transmissions from the second interference canceled signal.

13 Claims, 4 Drawing Sheets

JOINT SIGNAL DEMODULATION IN A LOW AND HIGH DATA RATE CHANNEL ENVIRONMENT

CROSS REFERENCE TO RELATED APPLICATION(S)

This application claims the benefit of U.S. Provisional Application No. 60/578,715 filed Jun. 10, 2004, which is incorporated by reference as if fully set forth.

FIELD OF INVENTION

This invention generally relates to wireless communication systems. In particular, the invention relates to demodulating signals in a low and high data rate environment.

BACKGROUND

As the demand for both voice and data services increases, systems are being developed to better support both media. One such system is the Universal Mobile Terrestrial System (UMTS) Wideband Code Division Multiple Access (W-CDMA) communication system. In the frequency division duplex (FDD) mode, such as in release 99 (R4), voice communications are typically transmitted using dedicated channels (DCH). In another such system, CDMA2000, voice communications are typically transmitted using dedicated channels. Although data can be transmitted through various channels, high speed downlink packet access (HSDPA) is one W-CDMA approach and high speed packet channels is one CDMA2000 approach to support high data rate downlink transmissions.

Accordingly, it is desirable for a receiver in such a system to be capable of demodulating both channel types.

SUMMARY

A receiver is capable of demodulating both high data rate and low data rate transmissions. An antenna receives the high and low data rate transmissions, as a received signal. An interference canceling device cancels a contribution of at least one shared/common channel from the received signal, producing a first interference canceled signal. A first data detector for detecting data of one of the high or low data rate transmissions by processing the first interference canceled signal. An interference canceling device for canceling the detected data of the one transmissions from the first interference canceled signal, producing a second interference canceled signal. A second data detector for detecting data of an other of the high or low data rate transmissions from the second interference canceled signal.

BRIEF DESCRIPTION OF THE DRAWING(S)

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment. Although the following embodiments are described in connection with W-CDMA and CDMA2000, they can be applied to other wireless systems having multiple transmission data rates.

Figure 1:
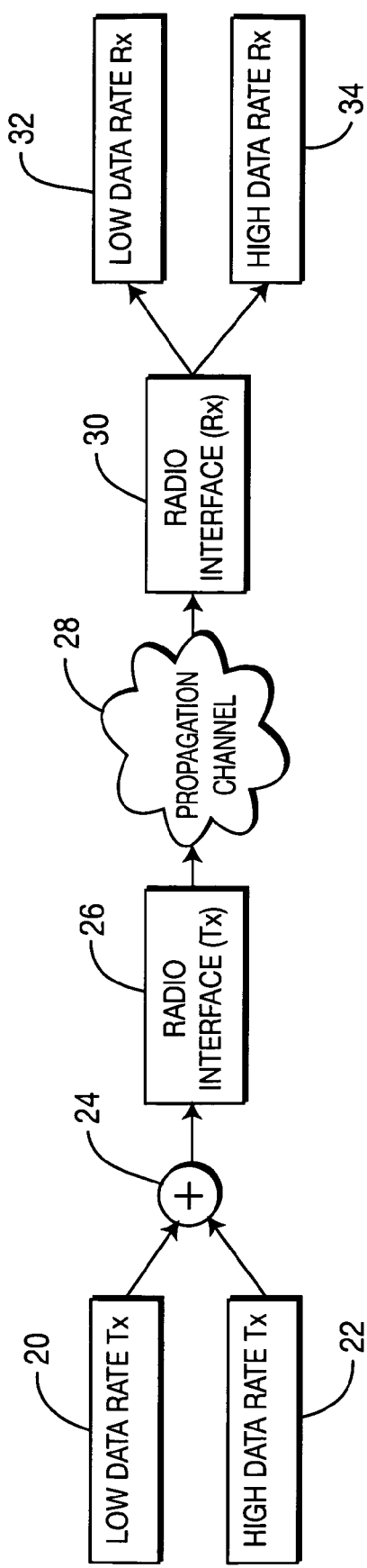
FIG. 1 is a simplified diagram of a system handling both low data rate and high data rate communications.

FIG. 1 illustrates a simplified diagram of a system handling both low data rate, such as frequency division duplex (FDD) W-CDMA or CDMA2000 dedicated channel communications, and high data rate, such as FDD HSDPA or CDMA2000 high speed packet communications. At the transmitter, both low data rate 20 and high data rate 22 transmissions (Txs) are combined by a combiner 24, such as at the baseband. A Tx radio interface 26 transmits the channels through a propagation channel 28. A receiver (Rx) radio interface 30 receives the channels and, typically, a separate low data rate Rx 32 and high data rate Rx 34 demodulates their respective data streams.

In such an environment, considerable interference and noise creates problems and degrades the performance of the low data rate and high data rate Rx. To illustrate, due to the nature of high data rate transmissions, these transmissions tend to be sent at high power levels. These high power level transmissions can create significant interference with respect to low data rate transmissions.

Additionally, both FDD and CDMA2000 dedicated channels use soft handover between base stations or softer handover between base station sectors. High data rate packet transmissions do not use soft/softer handover. As a result, a WTRU that borders cells will likely be in soft handover low data rate transmissions but it may only intentionally receive high data rate transmissions from one base station. With respect to reception of high data rate transmissions, not only does intra-cell interference from the other low data rate communications exist, but significant inter-cell interference exists from the other cells low data rate transmissions, including the soft handover transmissions. As a result, the high data rate channel capacity may degrade as well as the number of high data rate channels that can be maintained in the system.

Figure 2:
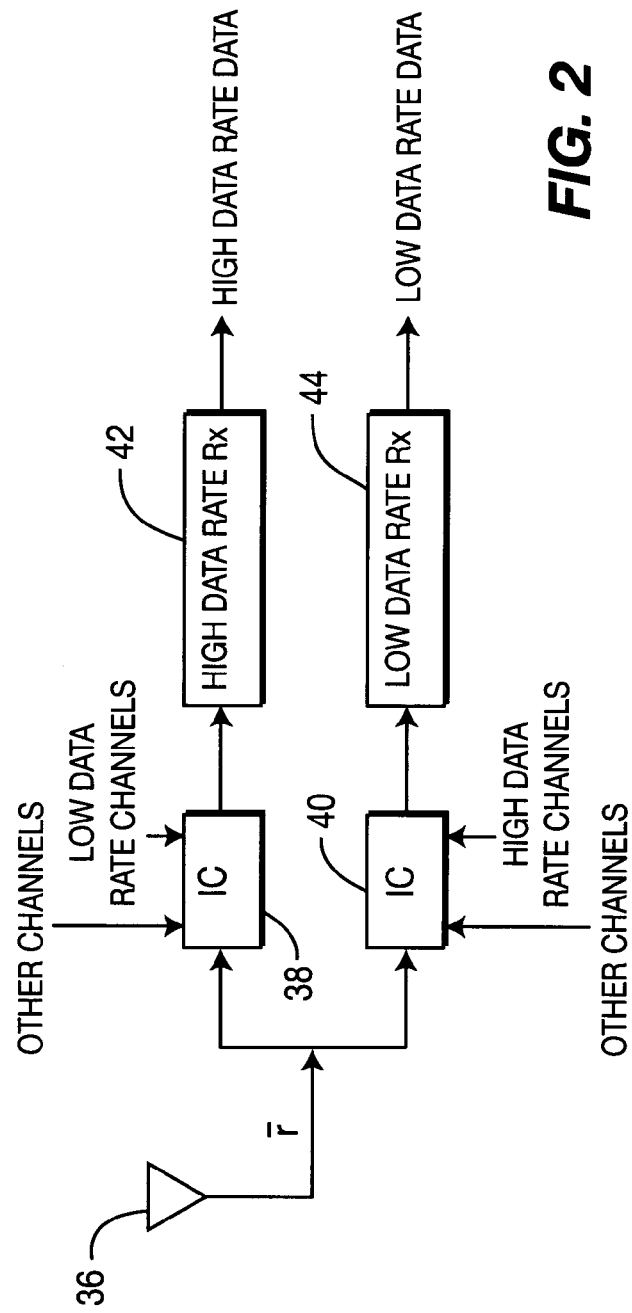
FIG. 2 is a simplified diagram of a low and high data rate joint receiver.

FIG. 2 is a simplified receiver for use in a WTRU, or potentially a base station for handling both low data rate transmissions, such as FDD or CDMA2000 dedicated channels, and high data rate transmissions, such as HSDPA or CDMA2000 high speed packet data. An antenna 36 or antenna array receives both transmissions. An interference canceller is used to cancel interference and noise prior to high data rate Rx operations.

Figure 3:
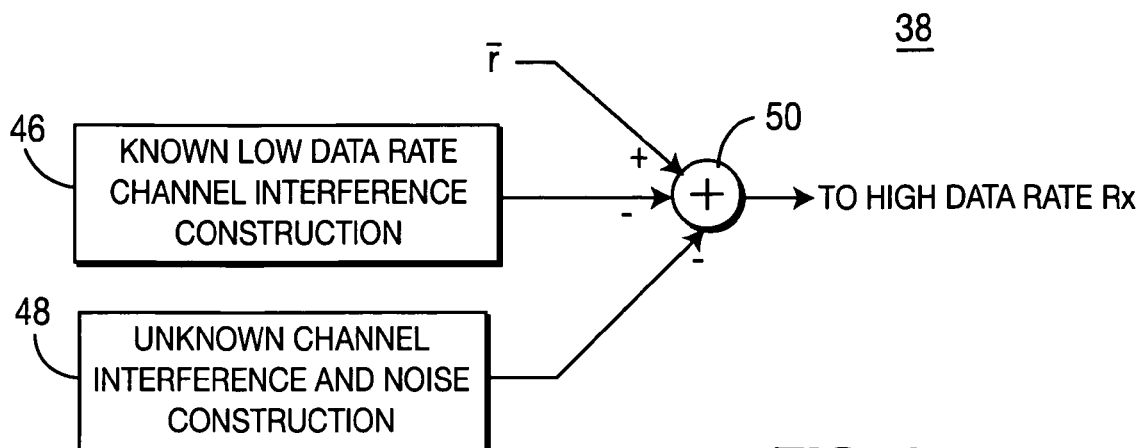
FIG. 3 is a simplified diagram of a low data rate interference/noise canceller for use with a joint receiver.

The interference canceller 38 as illustrated in FIG. 3 takes the received samples $\bar{r}$ and uses interference and noise construction to cancel, such as by a subtractor 50, these components from the samples $\bar{r}$. An estimation of the contribution of the known low data rate channels 46 to the received vector $\bar{r}$ is constructed. These channels may include low data rate dedicated and other channels from the base station of the high data rate transmission, low data rate and high data rate transmission from other base stations (such as during soft handover) and other known channels. The contribution of other unknown channels and noise can also be estimated and canceled 48. Referring to FIG. 2, this interference canceled signal is processed by a high data rate Rx 42 to recover high data rate data/symbols.

Figure 4:
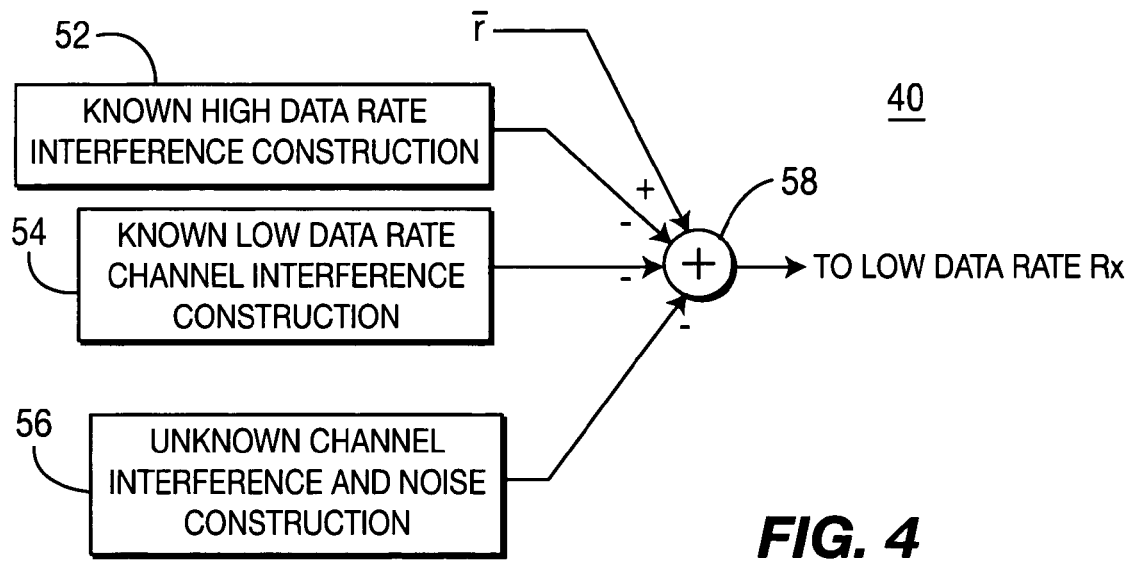
FIG. 4 is a simplified diagram of a high data rate interference/noise canceller for use with a joint receiver.

An interference canceller may also be used to cancel interference and noise prior to low data rate Rx operations. The interference canceller 52 as illustrated in FIG. 4 takes the received samples $\bar{r}$ and uses interference and noise construction to cancel, such as by a subtractor 58, these components from the samples $\bar{r}$. An estimation of the contribution of the known low data rate channels 54 to the received vector $\bar{r}$ is constructed. These channels may include high data rate and other channels 52 from the base station(s) of the low data rate transmission(s), low data rate and high data rate transmission from other base stations (such as during soft handover) and other known channels. The contribution of other unknown channels and noise 56 can also be estimated and canceled. Referring to FIG. 2, this interference canceled signal is processed by a low data rate Rx 44 to recover high data rate data/symbols.

Due to the potential high power level of high data rate transmissions, the estimated data from the high data rate transmissions may be used in the high data rate interference construction with respect to the low data rate Rx. Conversely, the estimated data from the low data rate transmission may be used in the low data rate interference constructions with respect to the high data rate Rx.

Figure 5:
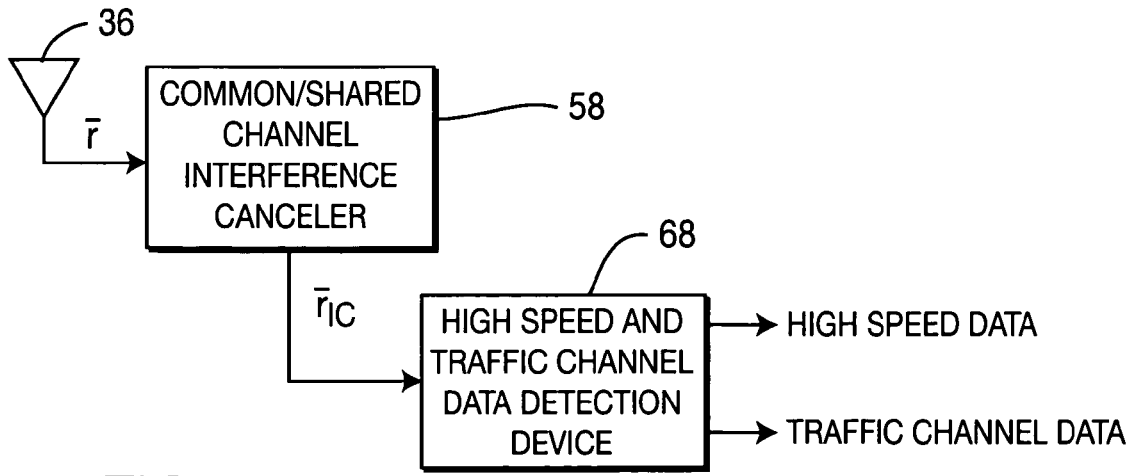
FIG. 5 is a simplified diagram of a joint low and high data rate receiver.

FIG. 5 is a simplified diagram of another embodiment of a low and high speed data receiver. Although the preferred use of such a receiver is in a WTRU, it may also be used in a base station. Low and high data rate transmissions are received by an antenna 36 or antenna array and a received vector, $\bar{r}$, is produced. A common/shared channel interference canceller 58 cancels the interference introduced onto the desired low/high data rate communications from common/shared channels. In some embodiments, the common/shared channel interference canceller 58 may not be used, with some potential degradation in receiver performance. The interference cancelled vector, $\bar{r}_{IC}$, is processed by a high speed and traffic channel data detection device 68 to produce data for both the high speed data and traffic channel data.

Figure 6:
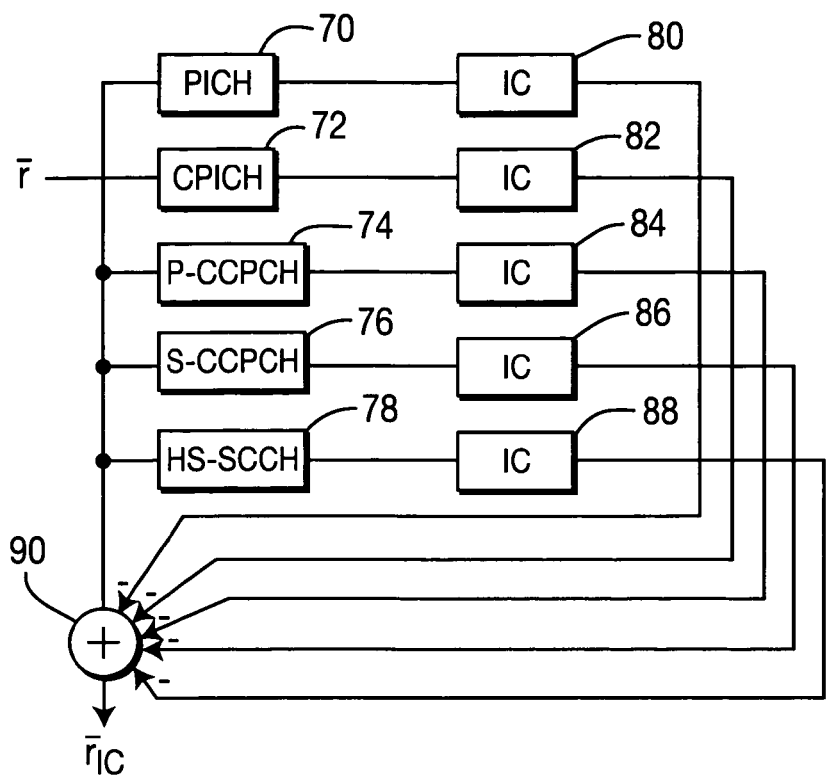
FIG. 6 is a simplified diagram of a common/shared channel interference canceller.

FIG. 6 is an illustration of an embodiment of a common/shared channel interference canceller for an FDD W-CDMA receiver. As illustrated in FIG. 6, a paging indicator channel (PICH) detector 70, a common pilot channel (CPICH) detector 72, a primary common control physical channel (P-CCPCH) detector 84, a secondary common control physical channel (S-CCPCH) detector 86 and a high speed shared control channel detector 88 detect data for the respective channels. For the data/symbols of each detected channel, a contribution of that channel to the received vector is produced by a respective interference construction device (IC) 80, 82, 84, 86, 88. The contributions from all the received channels are subtracted from the received vector, $\bar{r}$, by a subtractor 90, producing an interference cancelled vector, $\bar{r}_{IC}$.

Although the common/shared channel interference canceller is illustrated as a subtractive interference canceller, other interference cancellation techniques may be used. The FDD-W-CDMA common/shared channel interference canceller is illustrated with a particular set of channels being canceled, less channels may be used or additional channels may be canceled. For receivers in soft/softer handover or at the periphery of a cell, these channels may include channels from other cells/sectors.

The embodiment of FIG. 6 may also be implemented in a CDMA2000 receiver. For use in the downlink, the cancelled channels potentially include the pilot channel, synchronization channel, paging channel, broadcast control channel, forward common control channel, common assignment channel and forward dedicated control channel, although some of these channels may not be cancelled and other CDMA2000 channels may be canceled.

Figure 7:
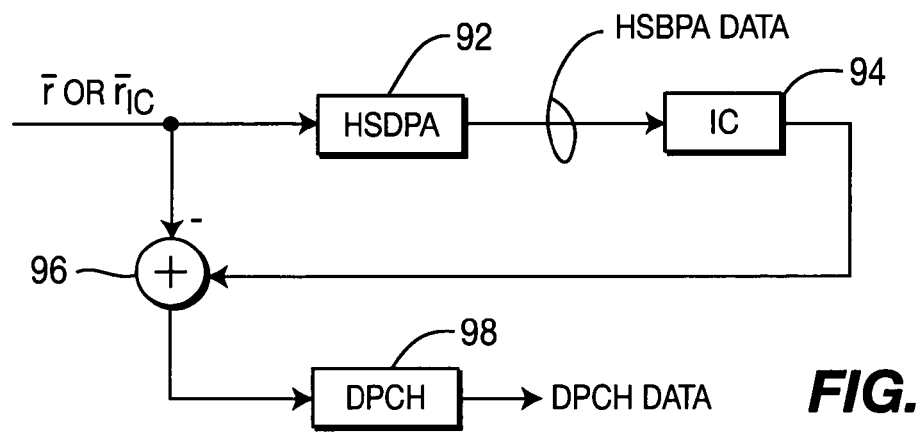
FIG. 7 is a simplified diagram of a joint demodulator with HSDPA interference cancellation.

FIG. 7 is a simplified diagram of high speed channel cancellation for a high speed and traffic channel data detection device for W-CDMA FDD. A HSDPA data detector 92 receives the received vector, $\bar{r}$, or the interference canceled vector, $\bar{r}_{IC}$, and produces HSDPA data/symbols. The HSDPA data/symbols are processed by an IC 94 to produce the contribution of the HSDPA channel with respect to the received vector. The HSDPA contribution is subtracted by a subtractor 96 from the vector, producing an HSDPA cancelled vector. A dedicated physical channel (DPCH) data detector 98 detects the DPCH data/symbols from the HSDPA interference cancelled vector.

Figure 8:
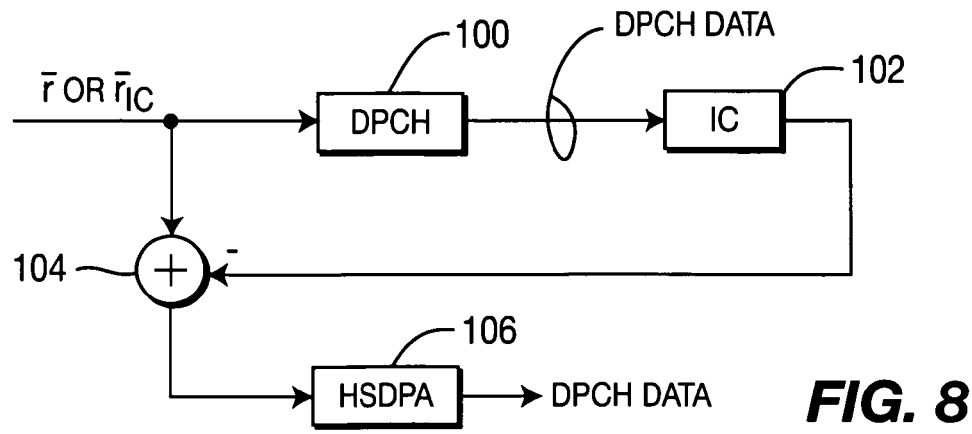
FIG. 8 is a simplified diagram of a joint demodulator with DPCH interference cancellation.

FIG. 8 is a simplified diagram of dedicated channel cancellation for a high speed and traffic channel data detection device for W-CDMA FDD. A DPCH data detector 100 receives the received vector, $\bar{r}$, or the interference canceled vector, $\bar{r}_{IC}$, and produces DPCH data/symbols. The DPCH data/symbols are processed by an IC 102 to produce the contribution of the DPCH channel with respect to the received vector. The DPCH contribution is subtracted by a subtractor 104 from the vector, producing a DPCH cancelled vector. A HSDPA data detector 106 detects the HSDPA data/symbols from the HSDPA interference cancelled vector.

Figure 9:
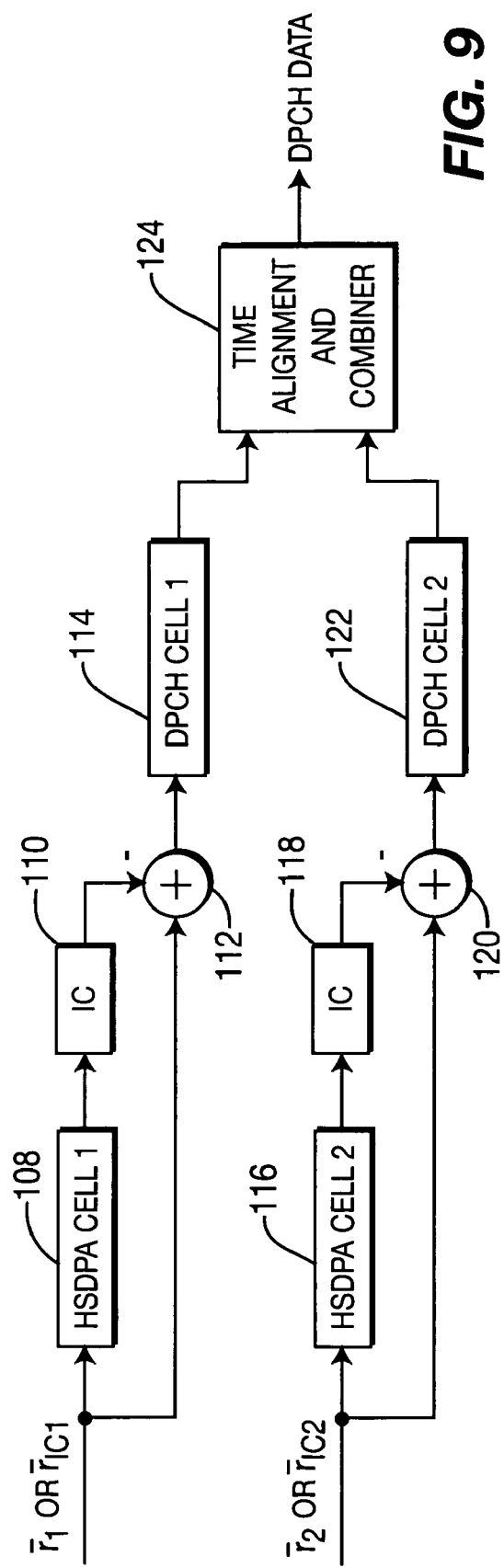
FIG. 9 is a simplified diagram of a joint demodulator with HSDPA interference cancellation during soft/softer handover.

FIG. 9 is a simplified diagram of high speed channel cancellation for a W-CDMA FDD data detector in soft/softer handover. The data detector of FIG. 9 is receiving an HSDPA transmission from cell 1 (cell sector 1) and DPCH transmissions from cell 1 and cell 2 (or cell sector 1 and cell sector 2). In FIG. 9, the received vector associated with each cell is shown separately. The timing of the received signals from the differing cells or sectors may not be aligned at the chip or symbol level and this separation in timing is shown as separate sets of received samples, although in some implementations one received vector may be used (such as in softer handover).

The received vector, $\bar{r}_1$, or interference canceled vector, $\bar{r}_{IC1}$, is associated with cell 1 (sector 1) and the received vector, $\bar{r}_2$, or interference canceled vector, $\bar{r}_{IC2}$, is associated with cell 2 (sector 2). A HSDPA cell 1 data detector 108 detects HSDPA data/symbols from cell 1 HSDPA transmissions. An IC 110 produces a contribution of the cell 2 HSDPA data/symbols to the cell 1 vector. The HSDPA cell 1 contribution is subtracted by a subtractor 112 from the cell 1 received vector, producing a cell 1 HSDPA canceled vector. A HSDPA cell 2 data detector 116 detects HSDPA data/symbols from cell 2 HSDPA transmissions. An IC 118 produces a contribution of the cell 2 HSDPA data/symbols to the cell 2 vector. The HSDPA cell 2 contribution is subtracted by a subtractor 120 from the cell 1 received vector, producing a cell 2 HSDPA canceled vector.

Since the HSDPA transmissions are at a higher data rate, they typically have higher transmission power levels. As a result, the HSDPA transmissions may create significant interference with respect to DPCH reception. However, due to the added complexity of detecting and canceling another cell's HSDPA transmission, the cancellation of HSDPA transmissions from the other cell (cell 2) may not be performed in certain implementations.

A DPCH cell 1 data detector 114 detects data from the cell 1 HSDPA canceled signal to produce soft cell 1 DPCH symbols. A DPCH cell 2 data detector 122 detects data from the cell 2 HSDPA canceled signal to produce soft cell 2 DPCH symbols. A time alignment and combiner 124 time aligns the cell 1 and cell 2 soft symbols and combines them producing the combined DPCH symbols/data.

Figure 10:
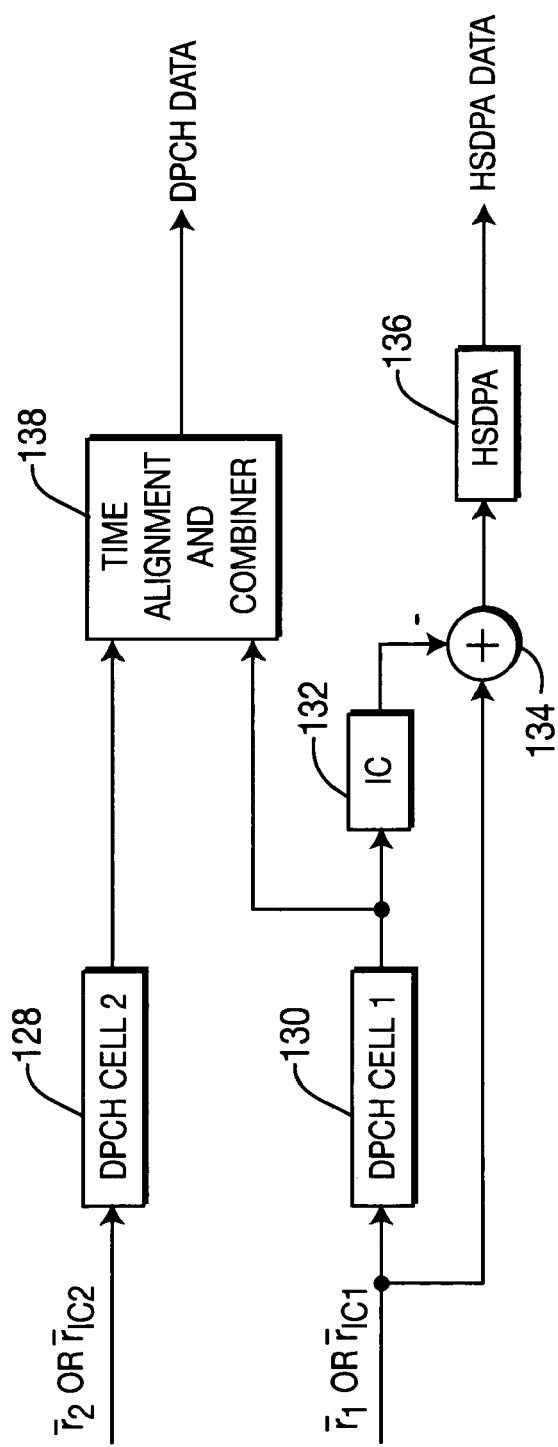
FIG. 10 is a simplified diagram of a joint demodulator with DPCH interference cancellation during soft/softer handover.

FIG. 10 is a simplified diagram of dedicated channel cancellation for a W-CDMA FDD data detector for soft/softer handover. Using the received vector, $\overline{r_2}$, or interference canceled vector, $\overline{r_{IC2}}$, of cell 2, the DPCH cell 2 detector 128 produces soft symbols for the DPCH transmitted from cell 2. Using the received vector, $\overline{r_1}$, or interference canceled vector, $\overline{r_{IC1}}$, of cell 1, the DPCH cell 1 detector 130 produces soft symbols for the DPCH transmitted from cell 1. A time alignment and combiner 138 time aligns the cell 1 and cell 2 soft symbols and combines them producing DPCH symbols/data.

An IC 132 produces a contribution of the cell 1 DPCH symbols to the cell 1 vector. The cell 1 DPCH contribution is subtracted by a subtractor 134 from the cell 1 received vector, producing a cell 1 DPCH canceled vector. An HSDPA data detector 136 detects the cell 1 HSDPA symbols/data from the interference cancelled vector. In an alternate configuration, the symbols produced by time alignment and combiner 138 (DPCH Data) may be used in the interference cancellation instead of only the cell 1 DPCH data. Although such an approach provides for added accuracy in the soft symbols used in the interference cancellation, it adds to its overall complexity since more timing coordination is required to overcome the timing differences between cell 1 and cell 2 DPCH/HSDPA reception. Although the above interference cancellers are described as subtractive interference cancellers, other types of interference cancellers may be used.

Although FIGS. 5-10 were described in connection with W-CDMA FDD, these interference cancellers can be applied to other wireless systems with low and high data rate channels. To illustrate, these Figures can apply to CDMA2000, where the forward packet data channel (F-PDCH) is analogous to HSDPA and CDMA2000 dedicated channels are analogous to FDD DPCHs.

FIGS. 2-10 can be implemented on an integrated circuit, multiple integrated circuits, logical programmable gate array (LPGA), multiple LPGAs, discrete components or a combination of integrated circuit(s), LPGA(s) and discrete component(s).

One technique that can be used to separate signals and effectively perform the interference cancellation of the preceding embodiments uses independent component analysis (ICA), such as in U.S. Provisional Application entitled "Creation of Matrices for Signal Separation", filed Jun. 8, 2005, incorporated by reference, although other techniques may be used. In that technique, principal component analysis is initially performed, then through ICA, a separation matrix is constructed using statistical processing to separate the signals and signal analysis is performed to determine signals of interest. Such an approach may be desirable to use with multiple antenna elements, such as multiple input multiple output (MIMO), single input multiple output (SIMO) and multiple input single output (MISO).

What is claimed is:

1. A receiver configured to receive a wireless data transmission, the data transmission comprising a low data rate transmission and a high data rate transmission, comprising:
   an antenna configured to receive the wireless data transmission as a received vector;
   a common/shared channel interference canceller configured to cancel data from at least one shared channel from the received vector to produce an interference cancelled vector;
   a downlink physical channel (DPCH) data detector configured to detect the low data rate transmission in the interference cancelled vector;
   a DPCH interference canceller configured to subtract the contribution of the low data rate transmission from the interference cancelled vector to produce a DPCH cancelled vector;
   a high speed downlink packet access (HSDPA) data detector configured to detect the high data rate transmission from the DPCH cancelled vector.

2. The receiver of claim 1 wherein the antenna is further configured to receive a plurality of low data rate transmissions, wherein each of the plurality of low data rate transmissions is received from one of a plurality of cells.

3. The receiver of claim 2 further comprising:
   a combiner configured to combine a plurality of received low data rate transmissions received from a plurality of cells.

4. The receiver of claim 1, wherein the common/shared channel interference canceller is configured to detect at least one of: a page indicator channel (PICH), common pilot channel (CPICH), primary common control physical channel (P-CCPCH), secondary common control physical channel (S-CCPCH) and a high speed shared control channel (HS-SCCH).

5. The receiver of claim 1 wherein the wireless data transmission is a CDMA2000 data transmission and the low data rate transmission is a dedicated channel transmission and the high data rate transmission is a forward packet data channel (F-PDCH) transmission.

6. The receiver of claim 5 wherein the common/shared interference canceller is configured to detect at least one of: a pilot channel, synchronization channel, paging channel, broadcast control channel, forward common control channel, common assignment channel and forward dedicated control channel.

7. The receiver of claim 1 configured for use in a wireless transmit/receive unit.

8. The receiver of claim 1 configured for use in a base station.

9. A method to detect low data rate transmissions in a wireless data transmission, the data transmission comprising a low data rate transmission and a high data rate transmission, the method comprising:
   receiving the wireless data transmission as a received vector;
   detecting data from at least one common or shared channel;
   subtracting the contribution of the at least one common or shared channel from the received vector to produce an interference cancelled vector;
   detecting the low data rate transmission in the interference cancelled vector;

subtracting, in a common/shared channel interference canceller, the contribution of the low data rate transmission from the interference cancelled vector to produce a DPCH interference cancelled vector;

detecting the high data rate transmission from the DPCH interference cancelled vector.

10. The method of claim 9, further comprising:

receiving a plurality of low data rate transmissions, where each of the plurality of low data rate transmissions is received from one of a plurality of cells; and combining the plurality of received low data rate transmissions received from a plurality of cells.

11. The method of claim 9, wherein detecting data from at least one common or shared channel comprises detecting at least one of a page indicator channel (PICH), a common pilot channel (CPICH), a primary common control physical channel (P-CCPCH), a secondary common control physical channel (S-CCPCH) and a high speed-shared control channel (HS-SCCH).

12. The method of claim 9, wherein the wireless data transmission is a CDMA2000 data transmission, and the low data rate transmission is a dedicated channel (DCH) transmission and the high data rate transmission is a forward packet data channel (F-PDCH) transmission.

13. The method of claim 12, wherein detecting data from at least one common or shared channel comprises detecting at least one of: a pilot channel, a synchronization channel, a paging channel, a broadcast channel, a forward common control channel, a common assignment channel, and a forward dedicated control channel.

* * * * *

UNITED STATES PATENT AND TRADEMARK OFFICE
CERTIFICATE OF CORRECTION

PATENT NO. : 7,609,790 B2  Page 1 of 1
APPLICATION NO. : 11/149508
DATED : October 27, 2009
INVENTOR(S) : Yogendra Shah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this

Twelfth Day of October, 2010

David J. Kappos
*Director of the United States Patent and Trademark Office*